(12) United States Patent
Gotanda

(10) Patent No.: US 7,295,242 B2
(45) Date of Patent: Nov. 13, 2007

(54) ELECTRONIC CAMERA HAVING A MODE SETTING DEVICE

(75) Inventor: Yoshiharu Gotanda, Asaka (JP)

(73) Assignee: Fujifilm Corporation, Tokyo (JP)

( * ) Notice: Subject to any disclaimer, the term of this patent is extended or adjusted under 35 U.S.C. 154(b) by 606 days.

(21) Appl. No.: 09/867,684

(22) Filed: May 31, 2001

(65) Prior Publication Data
US 2001/0048473 A1 Dec. 6, 2001

(30) Foreign Application Priority Data
May 31, 2000 (JP) .............................. 2000-162834

(51) Int. Cl.
*H04N 5/225* (2006.01)
(52) U.S. Cl. .............. 348/360; 348/207.99; 348/211.9
(58) Field of Classification Search ................ 348/372, 348/207.1, 211.9, 211.6, 374, 375, 231.3, 348/231.4; 386/117, 120; 358/906, 909.1
See application file for complete search history.

(56) References Cited

U.S. PATENT DOCUMENTS

| | | | |
|---|---|---|---|
| 5,491,507 A * | 2/1996 | Umezawa et al. ....... 348/14.02 |
| 6,006,039 A * | 12/1999 | Steinberg et al. ............. 396/57 |
| 6,204,877 B1 * | 3/2001 | Kiyokawa ................. 348/211.3 |
| 6,256,452 B1 * | 7/2001 | Yamamoto ................... 386/117 |
| 6,327,001 B1 * | 12/2001 | Yamagishi ................... 348/552 |
| 6,515,705 B1 * | 2/2003 | Fumio et al. ............... 348/375 |
| 6,545,775 B1 * | 4/2003 | Watanabe et al. .......... 358/442 |
| 6,683,644 B1 * | 1/2004 | Nakao et al. ............... 348/273 |
| 6,760,074 B1 * | 7/2004 | Maruyama et al. ......... 348/375 |
| 6,775,361 B1 * | 8/2004 | Arai et al. ................ 379/93.17 |
| 2001/0012071 A1* | 8/2001 | Oeda et al. ............ 348/333.01 |
| 2002/0054221 A1* | 5/2002 | Hamamura ................. 348/231 |
| 2002/0191096 A1* | 12/2002 | Tanaka et al. ......... 348/333.06 |

FOREIGN PATENT DOCUMENTS

JP    5-232546    9/1993

* cited by examiner

*Primary Examiner*—Tuan V. Ho
(74) *Attorney, Agent, or Firm*—Birch, Stewart, Kolasch & Birch, LLP (57) ABSTRACT

In a divisional process for determining which of a camera mode, an OFF mode, and an audio mode is set by a mode setting switch, a process to close a lens cover of a taking lens is performed when the audio mode is set for achieving an audio play function that is unrelated to functions of a camera.

15 Claims, 8 Drawing Sheets

ELECTRONIC CAMERA HAVING A MODE SETTING DEVICE

BACKGROUND OF THE INVENTION

1. Field of the Invention

The present invention relates to an electronic camera, particularly to an electronic camera which opens and closes a lens cover.

2. Description of the Related Art

An electronic camera which automatically opens and closes a lens cover is known. In general, the lens cover is opened when a power switch is turned on, and it is closed when the power switch is turned off.

In a camera with a VTR, a lens cover is opened when a camera mode is set whereas it is closed when a VTR (play) mode is set (Japanese Patent Application Laid-open No. 5-232546).

No electronic camera has a function (e.g. music play function) totally unrelated to recording and image data.

Assume that an electronic camera has the function and a user carries it in a pocket. In such a case, protecting a taking lens is important since the taking lens is vulnerable to scratches and stains. However, if the lens cover is opened whenever a power switch is turned on, the taking lens cannot be protected when the function is to be used.

The camera with the VTR can protect the taking lens by closing the lens cover when the VTR mode is set. However, if a recording mode and a play mode (for displaying a captured image) are alternately switched, the lens cover is closed each time the play mode is set, and thus the user can not quickly perform a shooting.

SUMMARY OF THE INVENTION

The present invention has been developed in view of the above-described circumstances, and has as its object the provision of an electronic camera which can protect a taking lens in an operation mode for a function unrelated to a camera function and allow a user to quickly performs a shooting.

In order to achieve the above-described object, the present invention is directed to an electronic camera comprising: a mode setting device that sets a first mode for a function which is unrelated to functions of the camera; a lens cover for a taking lens; a lens cover driving device that opens and closes the lens cover; and a controlling device that controls the lens cover driving device when the first mode is set by the mode setting device, so that the lens cover is closed. In other words, because the function unrelated to the camera function is used when the first mode is set, the lens cover is automatically closed to protect the taking lens.

The first mode is for at least one of the following: an audio play function for playing music files recorded in a storage medium in the camera, an electronic book function, an electronic notebook function, and a portable phone function.

The controlling device does not accept an input from a switch of the camera when the first mode is set by the mode setting device, the switch being provided to a body of the camera for the functions of the camera. A misoperation of the camera while being carried can be prevented in that manner.

The electronic camera further has a recording mode for recording image data in a storage medium in the camera, and a play mode for playing an image on a monitor according to the image data stored in the storage medium in the camera, and the controlling device controls the lens cover driving device so that the lens cover is opened when the recording mode is set, and does not move the lens cover when the play mode is set. In other words, the lens cover does not open or close when the play mode is set, and as a result the lens cover keeps open even if the recording mode and the play mode are alternately switched. Therefore, the electronic camera keeps a quick operation.

The mode setting device chooses between the first mode and a second mode for the functions of the camera The mode setting device is a slide switch which is locked to set the first mode when the slide switch moves in a first direction, and the mode setting device is unlocked to alternately set the second operation mode and an OFF mode for turning off power of the camera when the slide switch moves in a second direction which is opposite to the first direction. In other words, when the first mode is set, the slide switch is locked so that the mode is not switched carelessly.

The second mode is a camera mode which includes the recording mode and the play mode, and the electronic camera further comprises another mode setting device that chooses between the recording mode and the play mode when the camera mode is set. Therefore, modes can be easily set.

The taking lens is collapsed before the lens cover is closed.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder a preferred embodiment will be described of the present invention in accordance with the accompanied drawings.

FIGS. 1-5 are a front view, a rear view, a plan view, a bottom view, and a plan view of the right side, respectively, of an electronic camera 10 of the present invention.

The electronic camera 10 with an audio play function is rectangular as shown in FIGS. 1-5 and pocket-sized.

Figure 1:
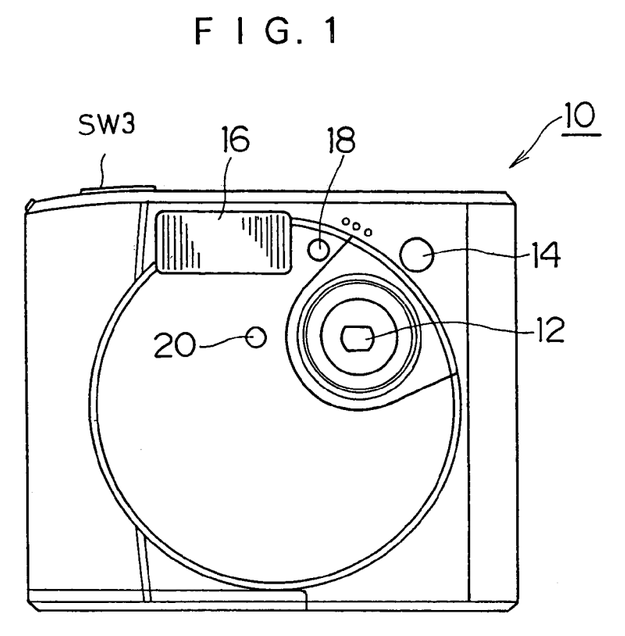
FIG. 1 is a front view showing an external appearance of a digital camera to which the present invention is applied.

In FIG. 1, a taking lens 12, a finder opening 14, a strobe 16, a strobe adjusting sensor 18, and a self-timer lamp 20 are provided at the front face of the digital camera 10. A lens cover 22 (refer to FIG. 6) which is opened and closed at a collapsing position of the taking lens 12 is also provided at the front face of the digital camera 10. The lens cover 22 in FIG. 1 is opened.

Figure 2:
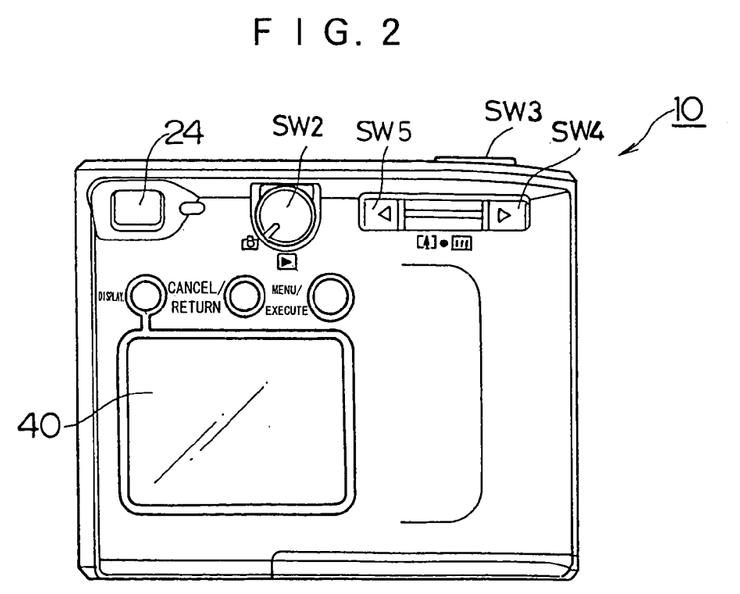
FIG. 2 is a rear view of the digital camera in FIG. 1.
Figure 3:
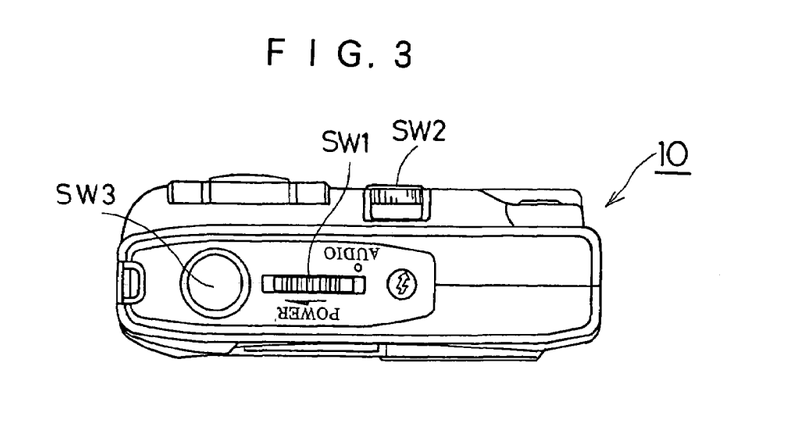
FIG. 3 is a plan view of the digital camera in FIG. 1.

In FIG. 2, a viewfinder 24, a mode dial switch SW2, a forward switch SW4, a reverse switch SW5, a liquid crystal monitor 40, and so forth, are provided at the rear face of the digital camera 10. In FIG. 3, a mode setting switch SW1 which is used also as a power switch and a shutter button SW3 are provided on the top face of the digital camera 10.

Figure 4:
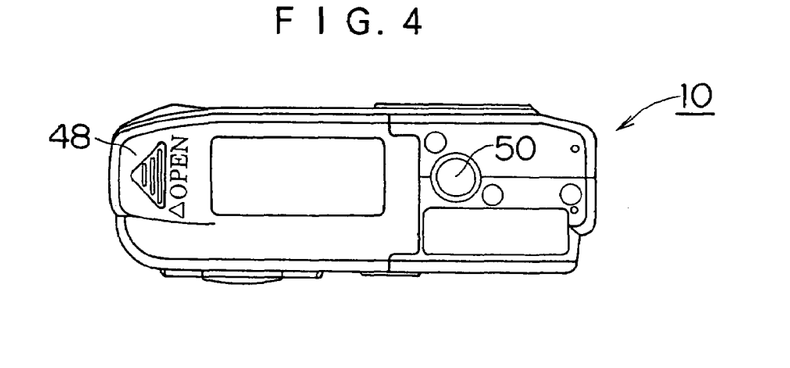
FIG. 4 is a bottom view of the digital camera in FIG. 1.
Figure 5:
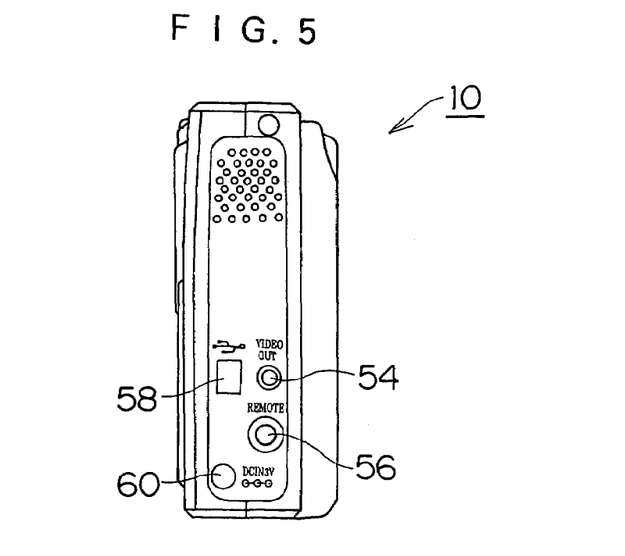
FIG. 5 is a plan view of the right side of the digital camera in FIG. 1.

In FIG. 4, a battery cover 48 which is used also as a slot cover of a memory card (a smart media), and a tripod screw hole 50 are provided at the bottom of the digital camera 10. In FIG. 5, an audio/video image output terminal 54, a remote control terminal 56 including an audio output terminal, a digital (USB) terminal 58, and a power input terminal 60 are provided at a side of the digital camera 10.

The mode setting switch SW1 which is used also as the power switch is locked when a knob moves to the right while unlocked when the knob moves to the left in FIG. 3. The mode setting switch SW1 sets the audio mode when moving the knob to the right and locking the knob, and also alternately sets a camera mode and an OFF mode for turning off the power within the camera whenever moving the knob to the left.

If the audio mode is set by the mode setting switch SW1, the respective switches of the camera do not function, and an input from a switch of a remote controller (not shown) with earphones (or headphones) connected with the remote control terminal 56 is only one to be accepted. Moreover, if the remote controller is unconnected with the remote control terminal 56 despite that the audio mode is set by the mode setting switch SW1, the power within the camera is held to be turned off. When operating the remote controller after connecting it with the remote controller terminal 56, the power within the camera is turned on.

The mode dial SW2 in FIG. 2 switches functions of the camera in a camera mode. The mode dial SW2 sets a recording mode for a still recording, or a play mode for play a photographed image by turning a mode dial 26.

A liquid crystal monitor 40 can be used as an electronic viewfinder and also can display a photographed image and a reproduced image which is read out from a memory card loaded in the camera. The liquid crystal monitor 40 also displays a number of unexposed frames, a number for a reproduced frame, presence of a strobe, a macro mode, quality of recorded data, a number of pixels, and so forth.

Figure 6:
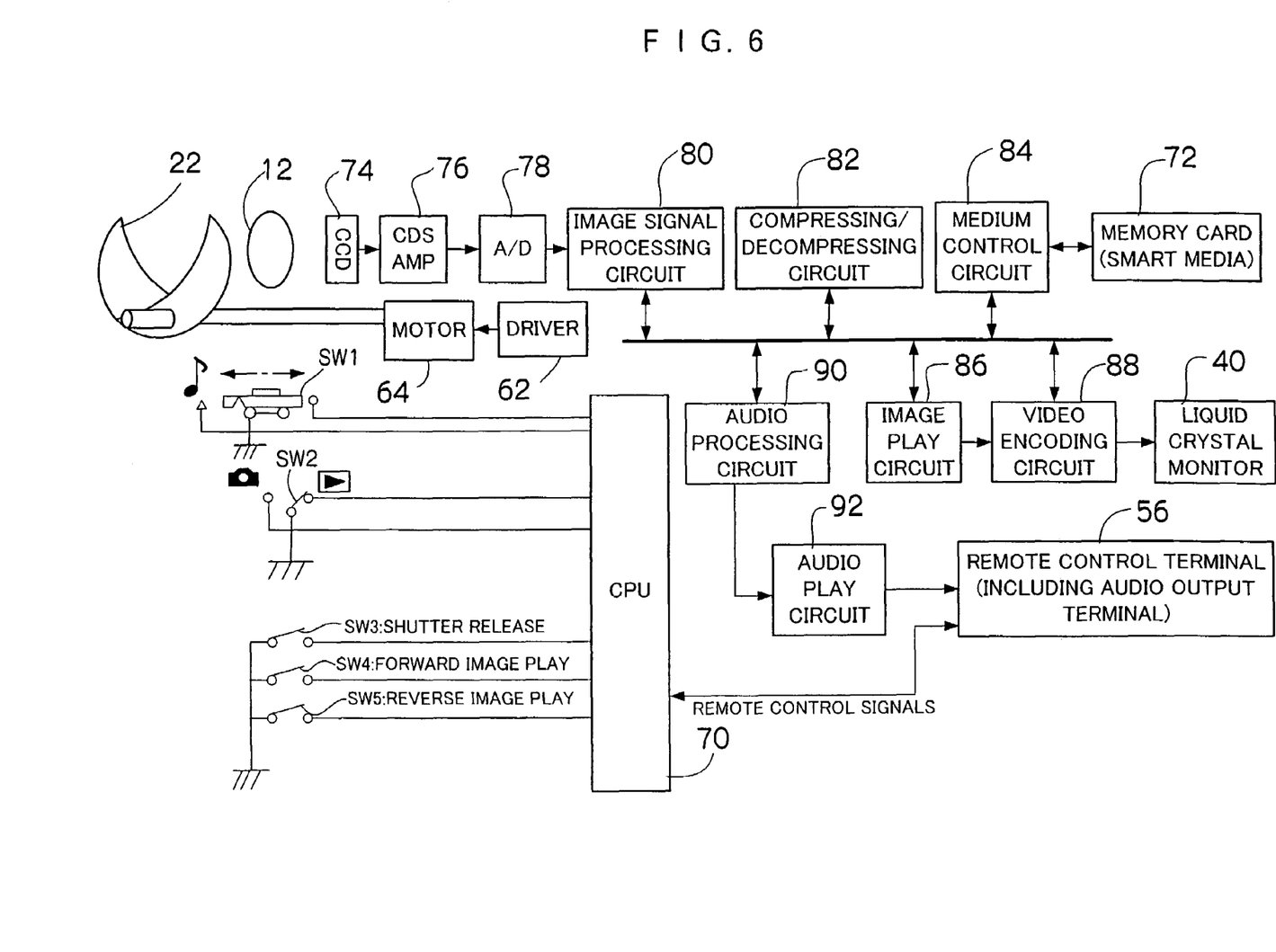
FIG. 6 is a block diagram showing an inner structure of the digital camera.

FIG. 6 is a block diagram showing an inner structure of the digital camera 10.

As seen from FIG. 6, a central processing unit (CPU) 70 controls the respective circuits within the camera in accordance with inputs from the mode setting switch SW1, the mode dial SW2, a shutter button SW3, the remote controller (not shown), and so forth, which are mentioned above.

When the mode setting switch SW1 sets from the OFF mode to the camera mode, the CPU 70 detects the setting, and turns on the power within the camera and at the same time controls the camera for opening the lens cover 22. When the mode setting switch SW1 sets from the camera mode to the OFF mode, the CPU 70 again detects the setting, and controls the camera for completely closing the lens cover 22.

If opening the lens cover 22 at that state, the CPU 70 rotates a motor 64 forward via a driver 62; if closing the lens cover 22, the CPU 70 outputs a signal for reversely rotating the motor 64 via the driver 62. When completely closing the lens cover 22, the CPU 70 outputs a signal for reversely rotating the motor 64 via the driver 62. When completely closing the lens cover 22, the taking lens 12 is so controlled beforehand as to move to a collapsing position.

Now, the camera mode is set by the mode setting switch SW1 and the recording mode is set by the mode dial SW2, then the shutter button 42 is pressed. The CPU 70 detects the above processes and performs a still recording, then records the image data of one frame obtained by the recording into a memory card 72. In other words, the CPU 70 performs a focus control and an exposure control, and forms a subject light on a light receiving face of a solid state imaging device (CCD) 74 through the taking lens 12.

The CCD 74 converts the subject light formed on the light receiving face into a signal charge in an amount corresponding with an amount of the subject light. The signal charge accumulated by this manner is sequentially read out as a voltage signal corresponding with the signal charge. The voltage signal which is sequentially read out from the CCD 74 is applied to a coefficient double sampling circuit (CDS circuit) 76 where R, G, and B signals for the respective pixels are processed a sampling hold and are amplified, and the voltage signal is then applied to an A/D converter 78. The A/D converter 78 converts R, G, and B signals which are sequentially applied from the CDS circuit 76 into digital R, G, and B signals of 10 bits (0-1023), and outputs the signals to an image signal process circuit 80.

The image signal process circuit 80 performs predetermined image processes such as a parallel processing for converting in parallel the sequential dots of R, G, and B signals applied from the A/D converter 78, a white balance adjustment, a gamma correction, and a YC signal processing. A brightness signal Y and a chroma signals Cr and Cb (YC signals) which are prepared by the YC signal processing of the image signal process circuit 80 are compressed into a predetermined format by a compression/expansion circuit 82, and recorded into the memory card 72 via a media control circuit 84.

On the other hand, when the camera mode is set by the mode setting switch SW1 and the play mode is set by the mode dial SW2, an image file of the last frame which is recorded in the memory card 72 is read out via the media control circuit. The compressed data of the read-out image file is now expanded to be an uncompressed YC signal via the compression/expansion circuit 82.

The expanded YC signal is then converted into a color composition video signal of an NTSC method via an image play process circuit 86 and a vide encoding circuit 88, and outputted to the liquid crystal monitor 40 as well as to the audio/video image output terminal 54 (refer to FIG. 5). Through the described process, the frame image of the last frame recorded in the memory card 72 is displayed on the liquid crystal monitor 40, whereas the frame image of the last frame is displayed on a TV when the audio/video image output terminal 54 is connected with the TV.

After that, the frames are sequentially fed when pressing the forward switch SW4, whereas the frames are fed in reverse when pressing the reverse switch SW5. At that time, the image file which resides at a fed frame is read out from the memory card 72, and the frame image is reproduced on the liquid crystal monitor 40 in the same manner as described above. If the frames are fed forward while the frame image of the last frame is being displayed, the image file of the first frame which is recorded in the memory card 72 is read out, and the frame image of the first frame is reproduced on the liquid crystal monitor 40 and the TV.

Next, an audio play function of the digital camera 10 will be described in detail.

The audio play function reproduces a music file such as the MP3 format which is recorded in the memory card 72. When an audio mode is set by the mode setting switch SW1 and a remote controller with the earphone is connected with the remote control terminal 56 including the audio output terminal, the power within the camera is turned on, and audio reproduction is now possible. In the audio mode, the CPU 70 accepts remote control signals from the remote controller but not inputs from switches other than the mode setting switch SW1 which is used also as the power switch of the camera.

When pressing a remote controlled play button while the digital camera 10 is set at the audio mode, the music file is read out from the memory card via the media control circuit 84. The music file is downloaded directly from a personal computer, or downloaded via the digital terminal 58 (refer to FIG. 4) of the digital camera 10.

The compressed data of the music file which is read out from the memory card 72 is expanded into uncompressed music data via the compression/expansion circuit 82. The expanded music data is performed processes such as D/A converting by the audio processing circuit 90, and the music data is converted into an analog audio signal. The converted audio signal is amplified by an audio play circuit 92, and is outputted as audio through the audio outputting terminal and the earphone (not shown) within the remote control terminal 56.

Next, operations of the digital camera 10 are described with regard mainly to opening and closing of the lens cover 22 by referring to the flowcharts in FIGS. 7-11.

Figure 7:
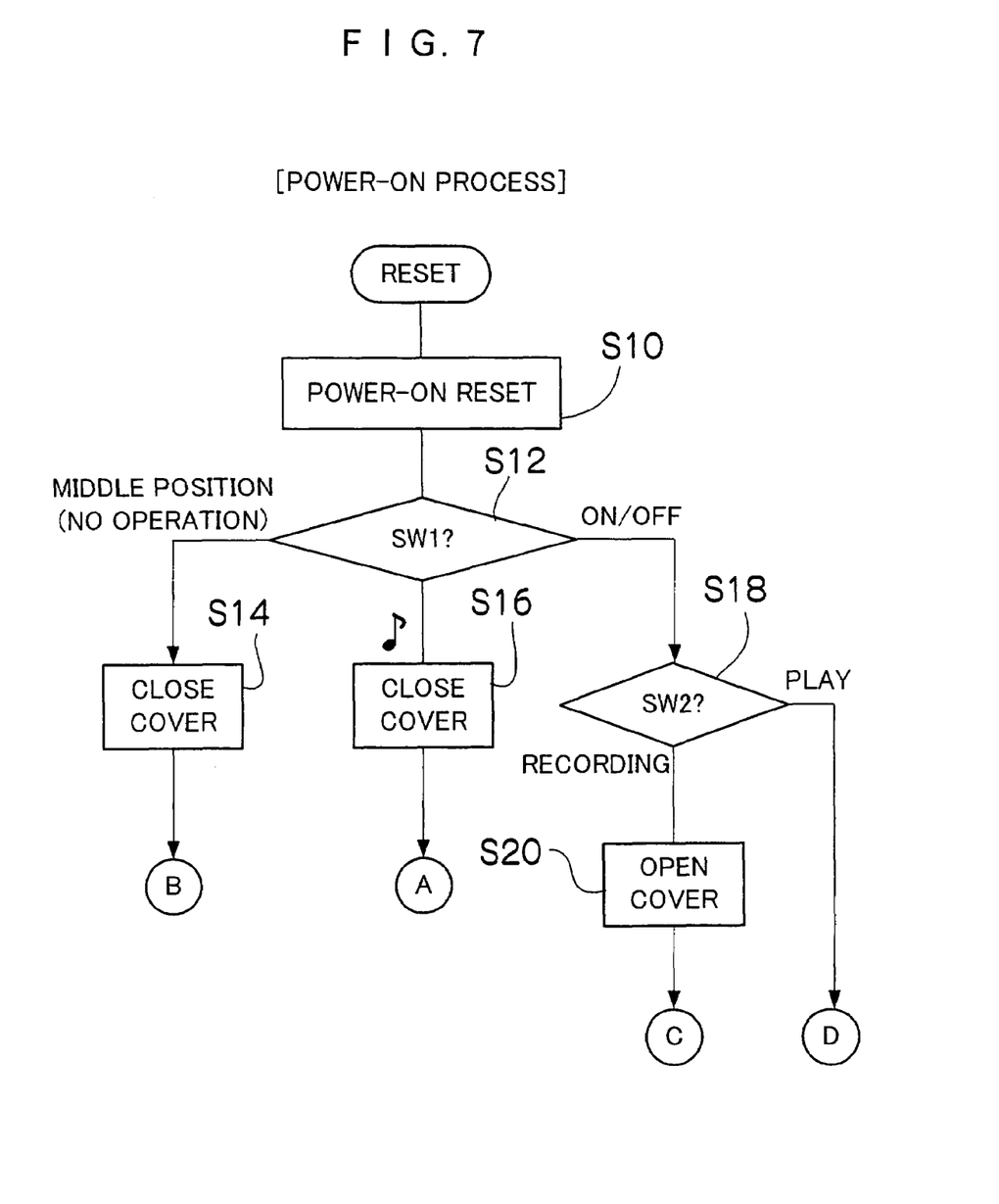
FIG. 7 is a flowchart for presenting a power-ON operation of the digital camera.

First, a power-ON process in FIG. 7 is described. As seen from FIG. 7, when the power is turned on by operating the mode setting switch SW1 which is also used as the power switch, the CPU 70 performs a process for a power-on reset such as an inner processing (setting a port) within the CPU 70 (Step S10), then performs a divisional process in response to a state of the switch SW1 (Step S12). If the switch SW1 is positioned at a middle position (no operation), the mode is an OFF mode, and the CPU 70 performs a process for closing the lens cover 22 (Step S14), then moves on to a process B (Step S50 in FIG. 9).

When the audio mode is set after the switch SW1 is locked at an audio position at Step S12, the CPU 70 performs a process for closing the lens cover 22 (Step S16), and then moves on to a process A (Step S22 in FIG. 8) of the audio mode A.

When the camera mode is set after the switch SW1 is moved to the ON/OFF position at Step S12, the CPU performs a divisional process responding to a state of the mode dial SW2 (Step S18). After that, the CPU 70 performs a process for opening the lens cover 22 if the mode is set at the recording mode (Step S20), and moves on to a process C (Step S60 in FIG. 10) of the recording mode. On the other hand, if a mode is set at a play mode, the CPU 70 moves on to a process D (Step S80 in FIG. 11) of the play mode.

Figure 8:
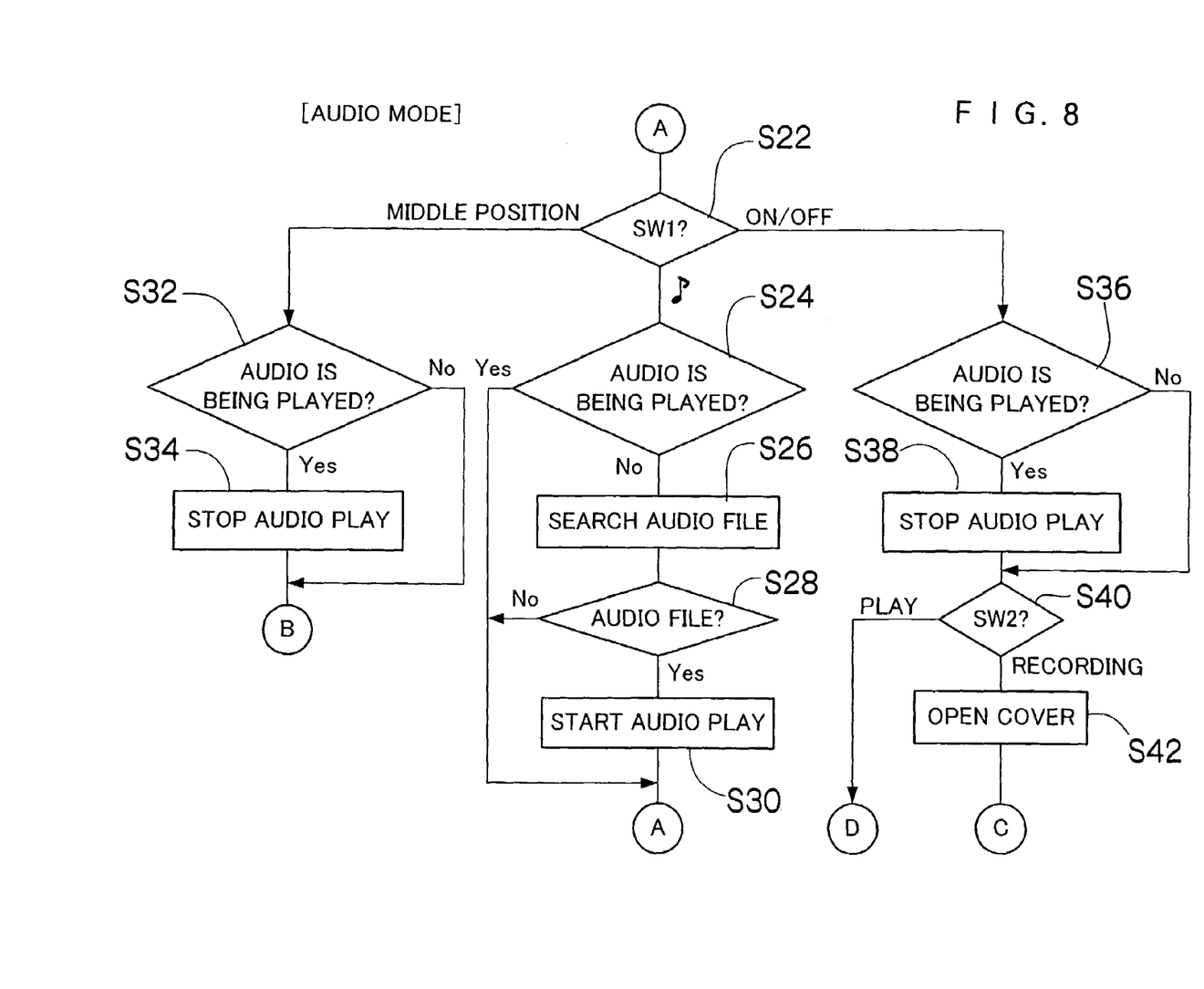
FIG. 8 is a flowchart for presenting an audio mode operation of the digital camera.

Next, a process of the audio mode in FIG. 8 will be described. In the divisional process of Step S22 in FIG. 8, the CPU 70 determines whether or not the audio play is being performed (Step S24) if the switch SW1 is locked at the audio position and the audio mode is continued. If the audio play is being performed, the CPU 70 returns to Step S22, and if the audio play is not performed, the CPU 70 searches an audio file within the memory card 72 (Step S26). Continuously, the CPU 70 performs a divisional process responding to the existence of the audio file (Step S28). If there is an audio file, the audio file is so read out to start the audio play (Step S30), and the CPU 70 returns to Step S22. On the other hand, if no audio file is found, the CPU returns to Step S22 without starting the audio play.

Moreover, when the OFF mode is set after moving the switch SW1 at a middle position in the divisional process of Step S22, the CPU 70 determines whether or not the audio play is being performed (Step S32). If the audio play is being performed, the CPU 70 moves on to the process B (Step S50 in FIG. 9) after stopping the audio reproduction; if the audio play is not performed, the CPU 70 moves on to the process B by leaving the process as it is.

In contrast, when the camera mode is set after moving the switch SW1 at the ON/OFF position in the divisional process of Step S22, the CPU 70 determines whether or not the audio play is being performed (Step S36). The CPU 70 moves on to a divisional process of Step S40 after stopping the audio reproduction (Step S38); if the audio play is not performed, the CPU 70 moves on to the divisional process of Step S40 by leaving the process as it is.

Figure 10:
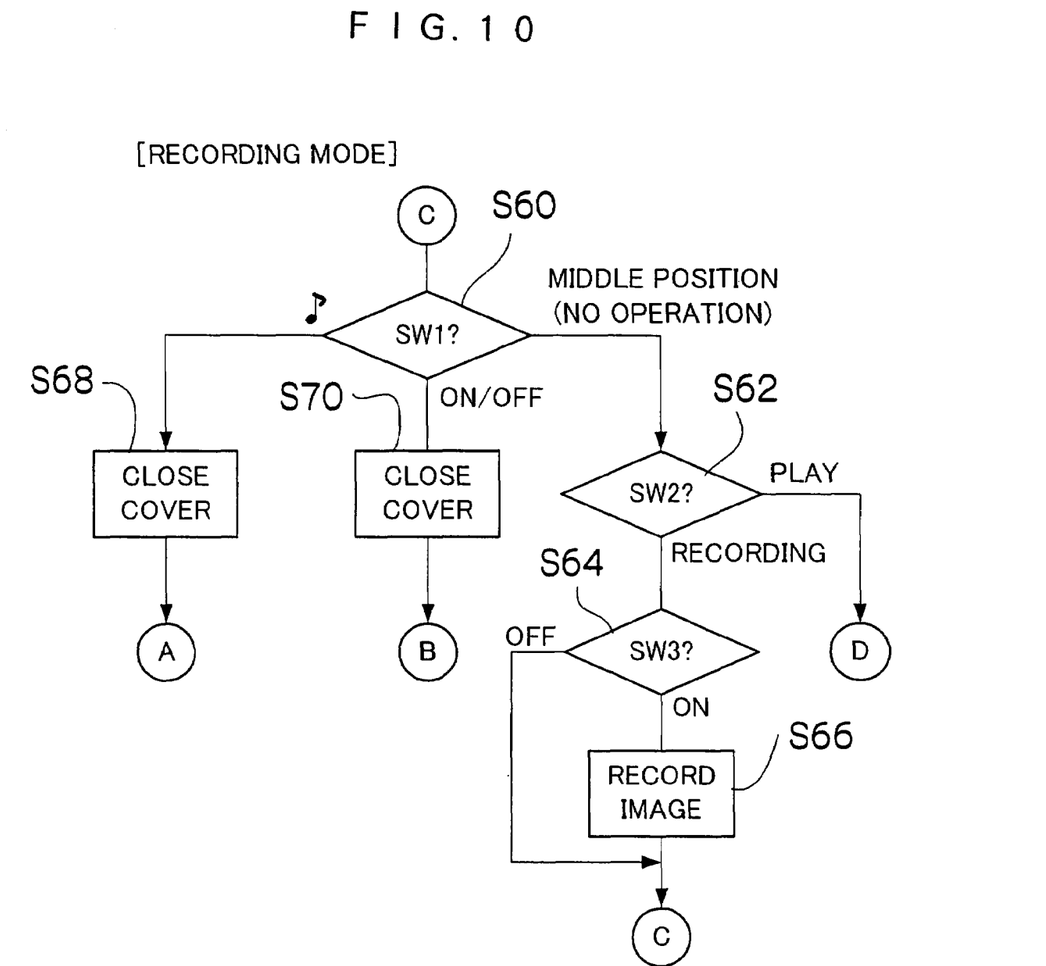
FIG. 10 is a flowchart for presenting a recording mode operation of the digital camera.

The CPU 70 determines which of the recording mode or the play mode is set by the switch SW2, and performs a process for opening the lens cover 22 if the recording mode is set (Step S42), then moves on to the process C (Step S60 in FIG. 10). On the other hand, if a mode is set at the play mode, the CPU 70 moves on to a process D (Step S80 in FIG. 11) without performing the opening/closing process for the lens cover 22.

Figure 9:
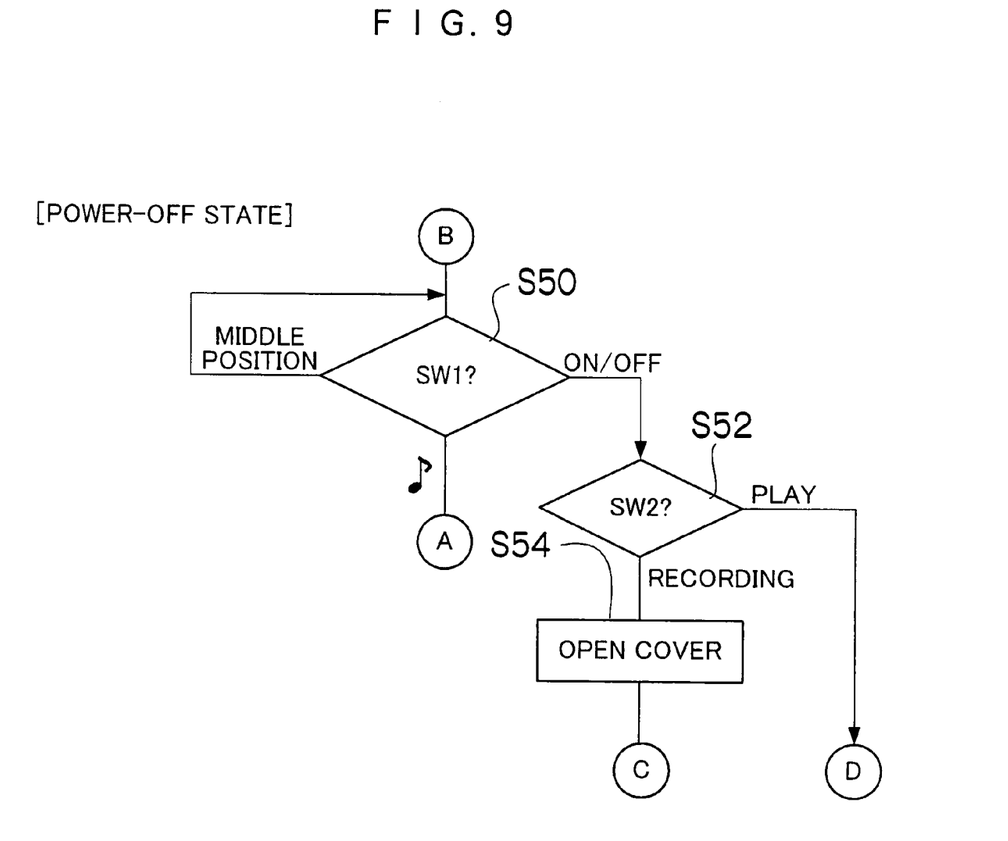
FIG. 9 is a flowchart for presenting a power-OFF operation of the digital camera.

Now, a process in a power-off state in FIG. 9 will be described. If the switch SW1 is at the middle position in a divisional process of Step S50 in FIG. 9, the power-off state continues; if the switch SW1 is locked at the audio position, the CPU 70 moves on to the process A (Step S22 in FIG. 8). On the other hand, if the camera mode is set after moving the switch SW1 at the ON/OFF position, the CPU 70 determines which of the recording mode or the play mode is set by the switch SW2.

After that, the CPU 70 performs a process for opening the lens cover 22 if the recording mode is set (Step S54), then moves on to the process C (Step S60 in FIG. 10). On the other hand, if the mode is set at the play mode, the CPU 70 moves on to the process D without performing the opening/closing process for the lens cover 22.

Here a process for the recording mode in FIG. 10 will be described. In a divisional process of Step S60, a camera mode continues when the switch SW1 is at a middle position. The CPU 70 determines which of the recording mode or the play mode is set by the switch SW2 (Step S62). The CPU 70 moves on to the process D (Step S80 in FIG. 11) if the play mode is set. On the other hand, the CPU 70 determines whether or not the shutter button SW3 is turned on if the recording mode is set. The CPU 70 instructs to perform a still recording if the shutter button SW3 is turned on, and instructs to record a compression process of one frame obtained by the recording and also instructs to the memory card 72 to record the compressed data (Step S66), then returns to the Step S60. On the other hand, the CPU 70 returns to the Step S60 without performing the process of Step S66 if the shutter button SW3 is not turned on.

In the divisional process of Step S60, when the switch SW1 is locked at the audio position, the CPU 70 performs a process for closing the lens cover 22 (Step S68), and moves on to the process A (Step S22 in FIG. 8) of the audio mode.

Likewise, in the divisional process of Step S60, when the switch SW1 is moved at the ON/OFF position and is set at the OFF mode, the CPU 70 performs a process for closing the lens cover 22 (Step S70), and moves on to the process B (Step S50 in FIG. 9) in the power-off state.

Figure 11:
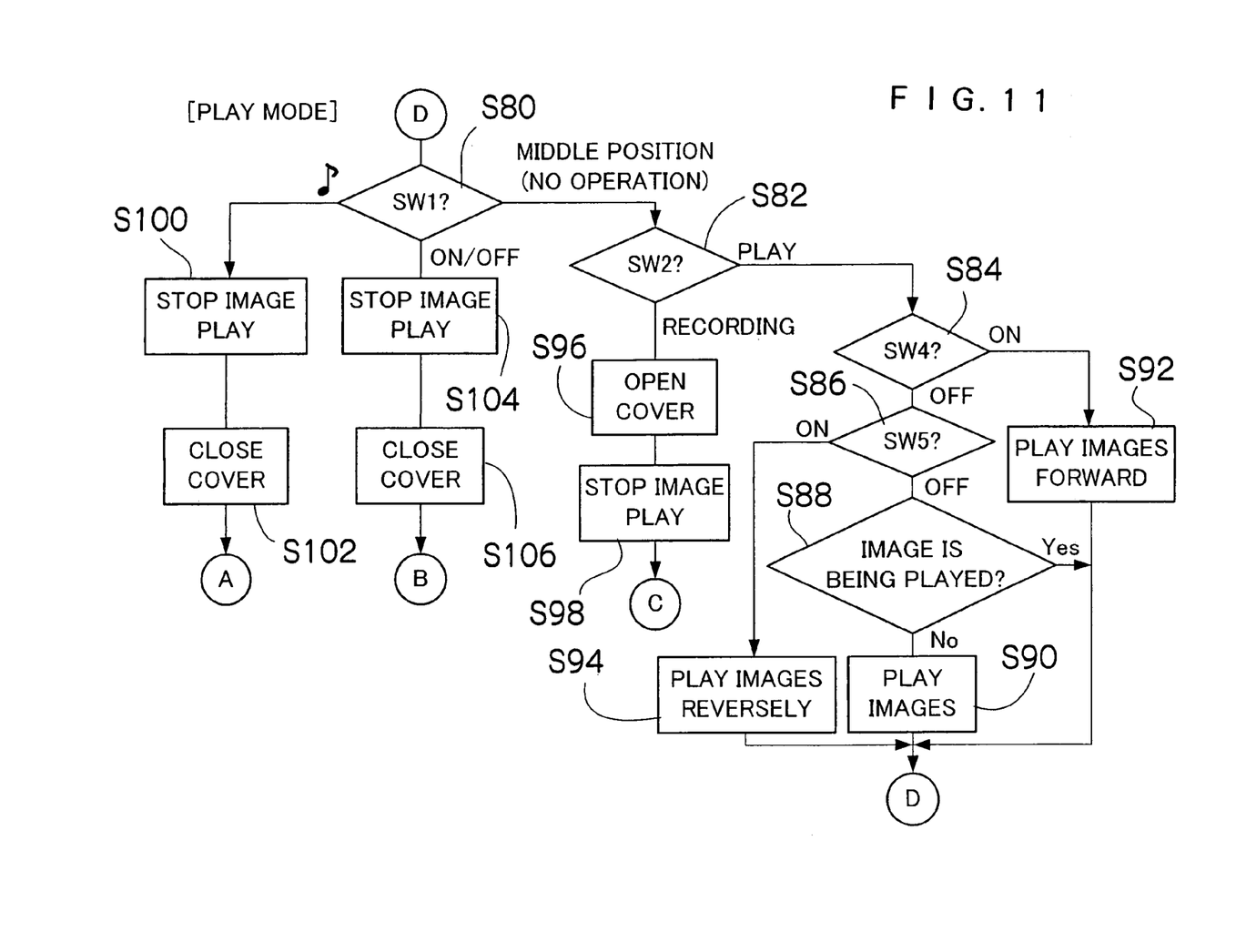
FIG. 11 is a flowchart for presenting a play mode operation of the digital camera.

A play mode in FIG. 11 is now described. In a divisional process of Step S80 in FIG. 11, a camera mode continues when the switch SW1 is at the middle position, and the CPU determines which of the recording mode or the play mode is set by the switch SW2 (Step S82). Then the CPU 70 determines whether or not the forward switch SW4 or the reverse switch SW5 is turned on (Steps S84 and S86) if the play mode is set.

The CPU 70 determines whether or not the image play is being performed if the switches SW4 and SW5 are turned off (Step S88). The CPU 70 returns to the Step S80 if the play is being performed, whereas it returns to Step S80 after performing a play process for an image which is reversely fed by one frame if the switch SW5 is turned on.

In a divisional process of Step S80, when the switch SW1 is locked and the audio mode is set, the CPU 70 stops an image play process (Step S100), and performs a process for closing the lens cover 22 (Step S102), then moves on to the process A (Step S22 in FIG. 8) of the audio mode.

Likewise, the CPU 70 stops the image play process if the switch SW1 is moved at the ON/OFF position and the OFF mode is set in the divisional process of Step S80 (Step S104), and performs a process for closing the lens cover 22 (Step S106), then moves on to the process B (Step S50 in FIG. 9) in the power-off state. If the lens cover 22 is closed in the play mode, the process for closing the lens cover 22 in Steps S102 and S106 are omitted.

In the present embodiment, an audio function is exemplified as a function which is unrelated to a function of the camera; however, such a function is not limited to the audio function; an electronic book function, an electronic notebook function, and a portable phone function may be ones. If a mode for achieving a function is set which is unrelated to a function of the digital camera with one of those functions, the lens cover is instructed to close. The present invention can be applied not only to a digital camera but also to a digital video camera.

As described above, according to the present invention, the lens cover is opened in an operation mode related to a function of the camera and a state in which recording is possible can be maintained at any time by exposing the taking lens (a quick operation); at the same time, the lens cover is closed in an operation mode for achieving a function unrelated to a function of the camera. Thus a taking lens can be effectively protected. Further, since inputs from a switch of the body of the camera which achieves a recording operation are prohibited during an operation mode which achieves a function that is unrelated to a function of the camera, a misoperation of the camera while being carried can be prevented.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic device comprising:
   a mode setting device that sets a first mode for a function which is unrelated to functions of a camera;
   a controlling device that prohibits the electronic device from performing functions related to the camera when said first mode is set by said mode setting device;
   a lens cover for a taking lens; and
   a lens cover driving device that opens and closes said lens cover,
   wherein the controlling device controls said lens cover driving device to close said lens cover when said first mode is set by said mode setting device; and
   wherein said electronic camera further has a recording mode for recording image data in a storage medium in the camera, and a play mode for playing an image on a monitor according to the image data stored in the storage medium in the camera; and
   said controlling device controls said lens cover driving device so that said lens cover is opened when said recording mode is set, and does not move the lens cover when said play mode is set.

2. The electronic device as defined in claim 1, wherein said first mode is for at least one of the following: an audio play function for playing music files recorded in a storage medium in the camera, an electronic book function, an electronic notebook function, and a portable phone function.

3. The electronic device as defined in claim 1, wherein said controlling device does not accept an input from a switch of the camera when said first mode is set by said mode setting device, said switch being provided to a body of the camera for the functions of the camera.

4. The electronic device as defined in claim 1, wherein said mode setting device chooses between said first mode and a second mode for the functions of the camera.

5. The electronic device as defined in claim 4, wherein:
said second mode is a camera mode which includes said recording mode and the play mode; and
the electronic camera further comprises another mode setting device that chooses between said recording mode and the play mode when the camera mode is set.

6. The electronic device as defined in claim 4, wherein:
said mode setting device is a slide switch which is locked to set the first mode when the slide switch moves in a first direction; and
said mode setting device is unlocked to alternately set said second operation mode and an OFF mode for turning off power of the camera when the slide switch moves in a second direction which is opposite to said first direction.

7. The electronic device as defined in claim 6, wherein:
said second mode is a camera mode which includes said recording mode and the play mode; and
the electronic camera further comprises another mode setting device that chooses between said recording mode and the play mode when the camera mode is set.

8. The electronic device as defined in claim 1, wherein said taking lens is collapsed before said lens cover is closed.

9. The electronic device as defined in claim 1, wherein the mode setting device is physically actuated directly by a user.

10. The electronic device as defined in claim 1, wherein the mode setting device does not set the first mode based upon a detection of a personal computer cable.

11. The electronic device as defined in claim 1, wherein the first mode permits portable operation.

12. A method for controlling a digital media device comprising:
determining the state of a mode selection device;
establishing one of a first mode of operation and a second mode of operation based upon the determining, wherein the first mode of operation provides a function unrelated to functions of a digital camera; and
protecting a taking lens of the digital media device during the first mode of operation by closing a lens cover when said first mode is established wherein:
said digital media device further has a recording mode for recording image data in a storage medium in the digital media device, and a play mode for playing an image on a monitor according to the image data stored in the storage medium in the digital media device; and
said controlling device controls said lens cover driving device so that said lens cover is opened when said recording mode is set, and does not move the lens cover when said play mode is set.

13. The method according to claim 12, wherein the first mode of operation provides functionality associated with non-image data.

14. The method according to claim 12 wherein the first mode of operation permits portable operation.

15. The method according to claim 13, wherein the first mode of operation functions without being operably coupled to a personal computer.

* * * * *